(12) United States Patent
Morizur

(10) Patent No.: US 8,207,287 B1
(45) Date of Patent: Jun. 26, 2012

(54) POLYCARBONATE POLYMERS CONTAINING BISPHENOL COMPOUNDS

(75) Inventor: Jean-Francois Morizur, Evansville, IN (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 0 days.

(21) Appl. No.: 13/155,065

(22) Filed: Jun. 7, 2011

(51) Int. Cl.
*C08G 63/02* (2006.01)
*C08G 64/00* (2006.01)

(52) U.S. Cl. ........ 528/176; 524/413; 524/423; 524/427; 525/437; 528/190; 528/192; 528/193; 528/194; 528/271; 528/272; 528/335; 528/350

(58) Field of Classification Search ................... 524/413, 524/423, 427; 525/437; 528/176, 190, 192, 528/193, 194, 271, 272, 335, 350
See application file for complete search history.

(56) References Cited

U.S. PATENT DOCUMENTS

| | | | |
|---|---|---|---|
| 3,313,777 A | 4/1967 | Elam et al. | |
| 3,326,855 A | 6/1967 | Matzner et al. | |
| 3,375,210 A | 3/1968 | D'Onofrio | |
| 3,541,200 A | 11/1970 | Niegisch | |
| 3,546,331 A | 12/1970 | Niegisch et al. | |
| 3,546,332 A | 12/1970 | Merriam et al. | |
| 3,674,623 A | 7/1972 | Niegisch et al. | |
| 5,965,688 A * | 10/1999 | Davies | 528/196 |
| 2009/0124749 A1 | 5/2009 | Steendam et al. | |
| 2010/0130700 A1 | 5/2010 | de Brouwer et al. | |
| 2011/0060106 A1 | 3/2011 | de Kraker et al. | |

OTHER PUBLICATIONS

U.S. Appl. No. 13/154,748, filed Jun. 7, 2011.

* cited by examiner

*Primary Examiner* — Terressa Boykin
(74) *Attorney, Agent, or Firm* — Venable LLP; Keith G. Haddaway; Michael E. Nelson

(57) ABSTRACT

Disclosed are polymers derived from units of bisphenol compounds, such as tetramethylcyclobutane diol-bisphenol, and processes for making and using them.

32 Claims, 1 Drawing Sheet

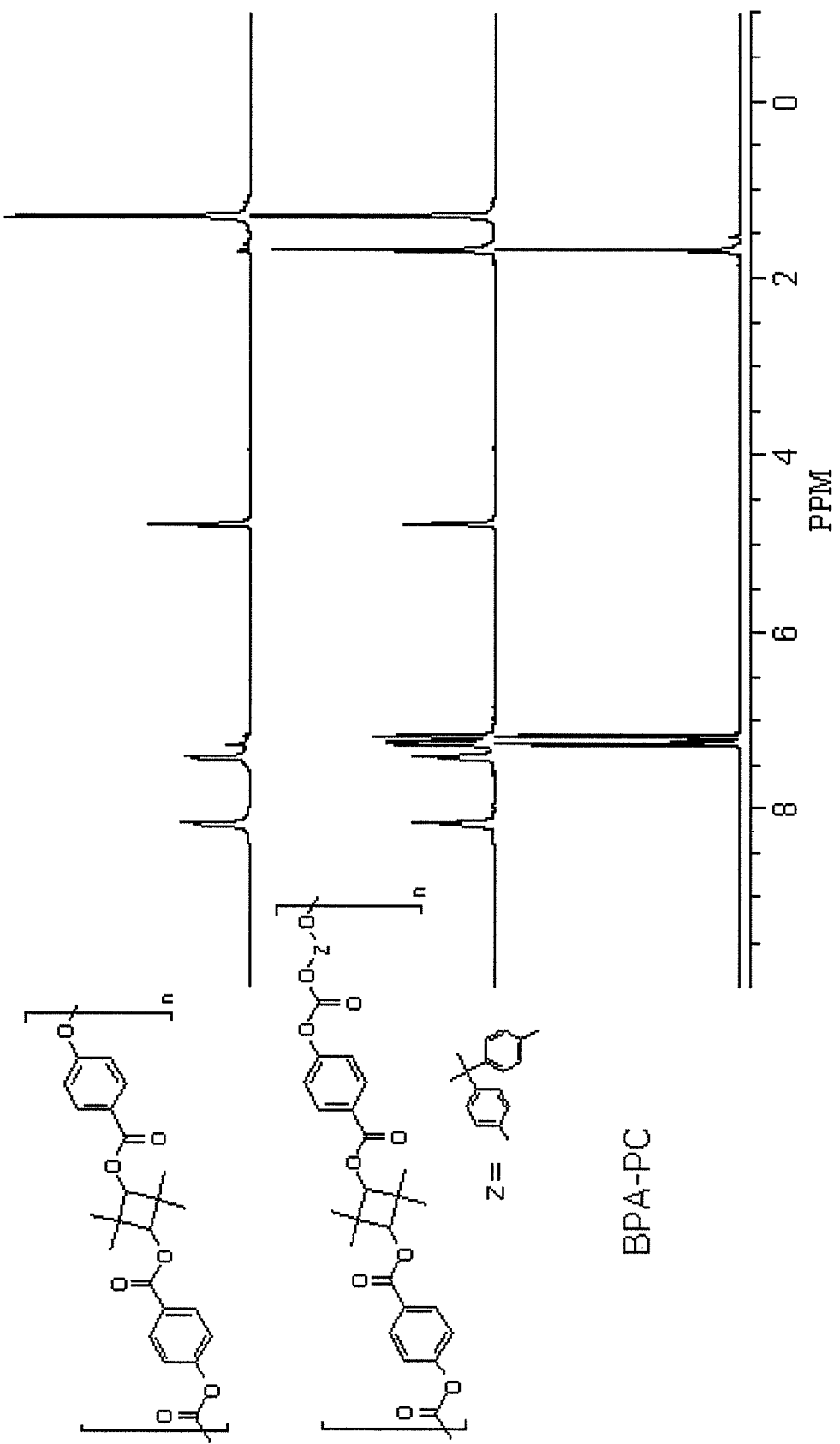

POLYCARBONATE POLYMERS CONTAINING BISPHENOL COMPOUNDS

FIELD OF THE INVENTION

The present disclosure relates to polymers and processes for making and using them. In particular, the present disclosure relates to polycarbonate polymers containing bisphenol compounds and methods of making them.

BACKGROUND OF THE INVENTION

In many cases, desirable properties can be imparted to polycarbonates and other polymers by reacting together one or more aromatic dihydroxy monomers via melt or interfacial polymerization process to form polycarbonate homopolymers and copolymers. In such cases, it is often desirable to obtain random incorporation of the monomers along the polymeric backbone to achieve desirable physical properties. This can be difficult to achieve by melt or interfacial polymerization essentially due to the inherent difference in reactivity of the monomers. It becomes even more challenging when aromatic dihydroxy compounds are copolymerized with aliphatic diols which present, for example, secondary alcohols, such as for example cyclobutane diols, for which the pKa is greater than commonly used bisphenols. The efficient polymerization of such compounds involves a significant number of trade-offs. For example, one can compensate for low reactivity by altering the amount of catalyst introduced into the system, but the temperature and reaction time would lead inherently to lower optical properties of the final polymeric material (e.g. yellowness and transparency).

It is known to prepare polymers from certain cyclobutane-diols such as from tetramethylcyclobutanediol (TMCBD) and aromatic dihydroxy compounds such as bisphenol A (BPA). However, preparation of the polymers employs solvents and high temperatures. U.S. Pat. Nos. 3,326,855, 3,313,777, 3,546,331, 3,546,332, 3,541,200, 3,375,210, and 3,674,623 disclose such polymers prepared from TMCBD. U.S. Pat. No. 5,965,688 discloses a method for making tetramethylcyclobutanediol-containing polycarbonates via interfacial polymerization involving aliphatic haloformates, prepared prior to the reaction, with aryl dihydroxy compounds.

The reaction of this invention relates to the polymerization of a bisphenol of TMCBD that permits copolymerization with other dihydroxy compounds.

BRIEF DESCRIPTION

Disclosed, in various embodiments, are polymers and processes for making and using them. In a particular embodiment, a process is provided for making a polymer by polymerizing a TMCBD-bisphenol via interfacial reaction.

In describing the various embodiments below, it should be understood that any recited substituents can be combined with any other substituents. In some embodiments, a polymer comprising units derived from a compound of Formula I is provided,

I

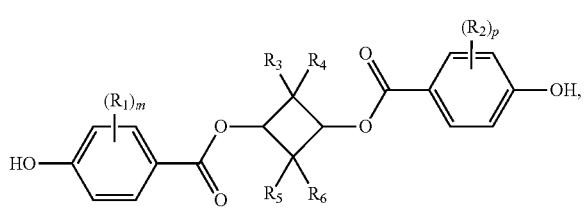

wherein m and p may be the same or different and are each an integer from 0-4; each $R_1$ and $R_2$ are the same or different and are each independently selected from one or more of halogen, $C_1$-$C_{12}$ alkyl, $C_1$-$C_6$ aliphatic, $C_3$-$C_6$ cycloaliphatic, $C_1$-$C_{12}$ alkoxy, and $C_1$-$C_{12}$ alkyl ester; and $R_3$, $R_4$, $R_5$, and $R_6$ are the same or different and are each independently selected from one or more of hydrogen, and $C_1$-$C_2$ aliphatic.

In certain aspects, the compound of Formula I comprises tetramethylcyclobutane diol-2,5-bis(4-hydroxybenzoate) of Formula Ia Ia

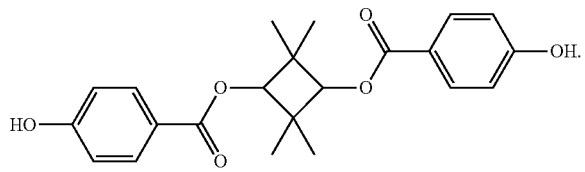

In some embodiments, the polymer may be a homopolymer or copolymer and is selected from one or more of polycarbonate, polyurethane, polyurea, polyarylate, polyester, polyether, polyetheramide, polyformyl, and polyphenylene ether.

In embodiments, the polymer may be a copolymer further comprising units derived from Formula V:

V

wherein Z is an aromatic moiety or an aliphatic moiety.

In certain embodiments, the polymer may comprise units of Formula II

II

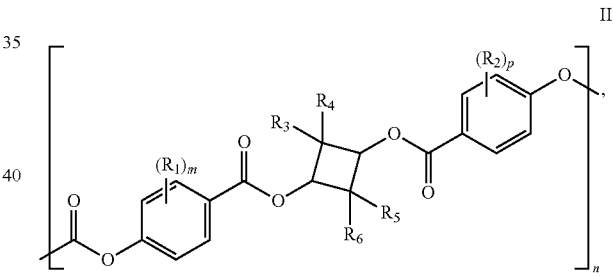

wherein m and p may be the same or different and are each an integer from 0-4; each $R_1$ and $R_2$ are the same or different and are each independently selected from one or more of halogen, $C_1$-$C_{12}$ alkyl, $C_1$-$C_6$ aliphatic, $C_3$-$C_6$ cycloaliphatic, $C_1$-$C_{12}$ alkoxy, and $C_1$-$C_{12}$ alkyl ester; and $R_3$, $R_4$, $R_5$, and $R_6$ are the same or different and are each independently selected from one or more of hydrogen, and $C_1$-$C_2$ aliphatic; and n is an integer from 1 to 500.

In yet other embodiments, the polymer may be a copolymer further comprising units of Formula VI

VI

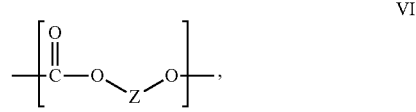

wherein Z is an aromatic moiety or an aliphatic moiety or —O—Z—O— is a fragment of Formula IV,

IV

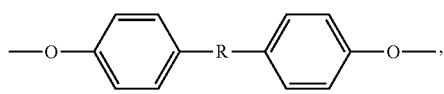

wherein R is selected from one or more of alkyl, aryl, and alkylaryl hydrocarbons of 1 to 20 carbon atoms, disubstituted oxygen, sulfone, and spirobiindane.

In some embodiments, the polymer may comprise units of Formula III

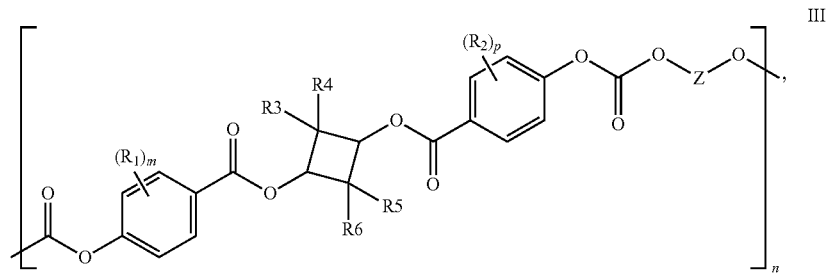

wherein m and p may be the same or different and are each an integer from 0-4; each $R_1$ and $R_2$ are the same or different and are each independently selected from one or more of halogen, $C_1$-$C_{12}$ alkyl, $C_1$-$C_6$ aliphatic, $C_3$-$C_6$ cycloaliphatic, $C_1$-$C_{12}$ alkoxy, and $C_1$-$C_{12}$ alkyl ester; and $R_3$, $R_4$, $R_5$, and $R_6$ are the same or different and are each independently selected from one or more of hydrogen, and $C_1$-$C_2$ aliphatic; n is an integer from 1 to 500; and O—Z—O comprises a structure of Formula IV

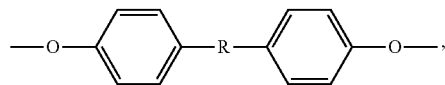

wherein R is selected from one or more of alkyl, aryl, and alkylaryl hydrocarbons of 1 to 20 carbon atoms, disubstituted oxygen, sulfone, and spirobiindane.

In certain aspects, R may be selected from one or more of alkyl groups having from 1-8 carbon atoms, isopropylidene, 1-phenylethyl, spirobiindane and mixtures thereof.

In yet other embodiments, the polymer may comprise units of the Formula IIa

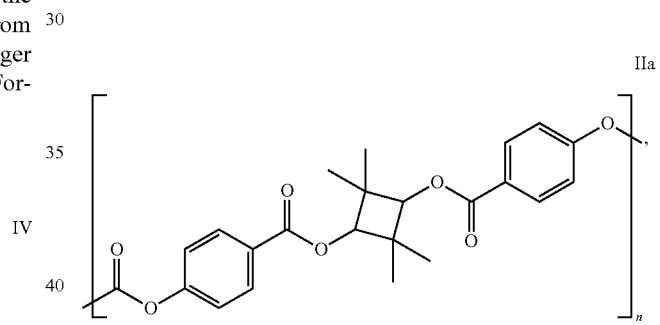

wherein n is an integer from 1 to 500.

In other embodiments, the polymer may comprise units of Formula IIIa

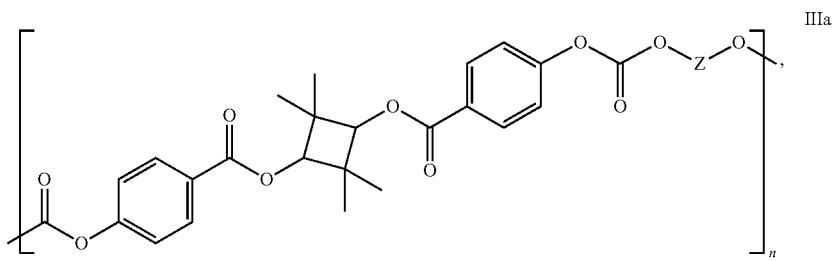

wherein n is an integer from 1 to 500; and Z is an aromatic moiety or an aliphatic moiety or O—Z—O comprises a structure of Formula IV

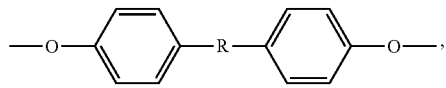

wherein R is selected from one or more of alkyl, aryl, and alkylaryl hydrocarbons of 1 to 20 carbon atoms, disubstituted oxygen, sulfone, and spirobiindane.

In embodiments, Z is derived from bisphenol A and the polymer includes units of Formula IIIb

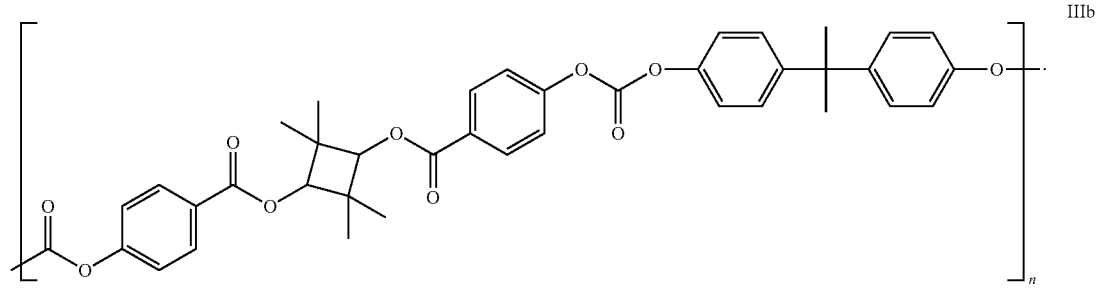

In embodiments, a process is provided for preparing a polymer from a compound of Formula I. In certain embodiments, a process is provided for preparing a polymer comprising polymerizing a compound of Formula I. In some aspects, the compound of Formula I is added to a formulation comprising phosgene, water and an organic solvent. In certain aspects, the polymer may be a homopolymer, or a copolymer.

In certain embodiments, the compound of Formula I may be copolymerized with a compound of Formula VII,

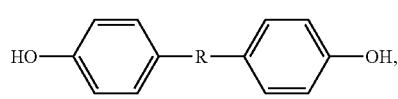

wherein R is selected from one or more of alkyl, aryl, and alkylaryl hydrocarbons of 1 to 20 carbon atoms, disubstituted oxygen, sulfone, and spirobiindane. In some aspects, the compound of Formula VII may comprise a compound of Formula VIII

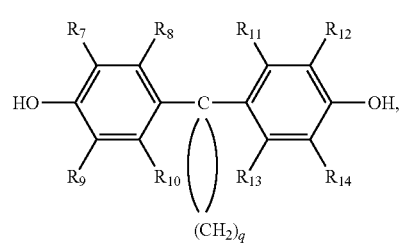

wherein q is an integer from 4-9, and each of $R_7$, $R_8$, $R_9$, $R_{10}$, $R_{11}$, $R_{12}$, $R_{13}$ and $R_{14}$ is independently selected from one or more of hydrogen or $C_1$-$C_6$ alkyl. In certain aspects, the compound of Formula VII may be bisphenol A. In yet a further embodiment, the compound of Formula I and Formula VII may be added to a formulation of phosgene, water and organic solvent.

In certain embodiments, the polymerizing may comprise an interfacial polymerization reaction. In yet other embodiments, the polymerizing may comprise melt polymerization reaction.

In embodiments, a process is provided for preparing a polymer having units of the Formula IIa,

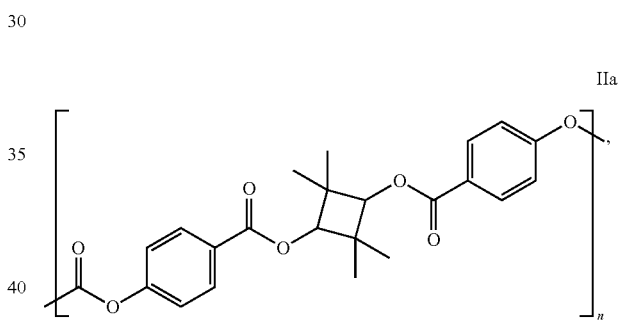

wherein n is an integer from 1 to 500, comprising adding a compound of Formula Ia

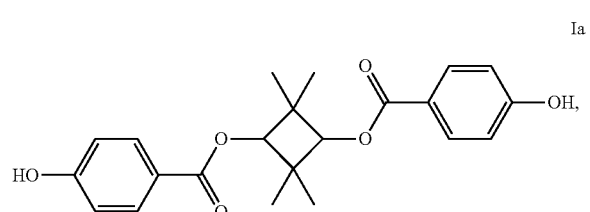

to a formulation comprising phosgene, water and organic solvent and polymerizing the compound of Formula Ia.

In yet other embodiments, a process is provided for preparing a polymer having units of the Formula IIIa,

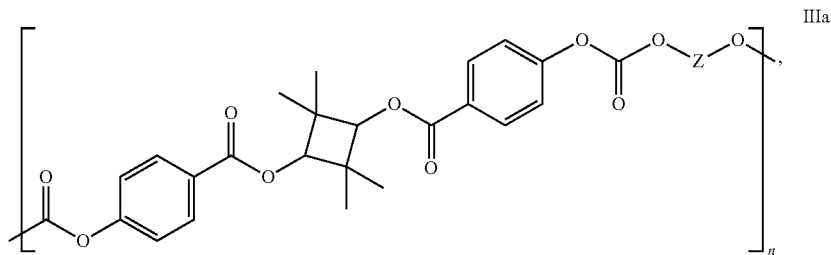

wherein n is an integer from 1 to 500 and Z is bisphenol A, comprising combining a compound of Formula I with bisphenol A, adding the combination to a formulation comprising phosgene, water and organic solvent and copolymerizing the compound of Formula I and bisphenol A.

In embodiments, an article of manufacture is provided comprising a polymer prepared from a composition containing the polymer comprising units derived from a compound of Formula I is provided,

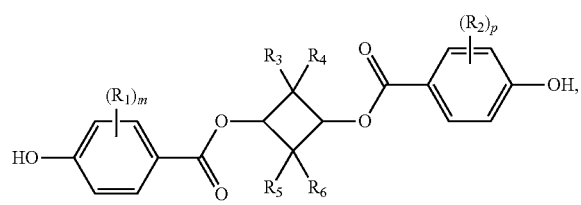

wherein m and p may be the same or different and are each an integer from 0-4; each $R_1$ and $R_2$ are the same or different and are each independently selected from one or more of halogen, $C_1$-$C_{12}$ alkyl, $C_1$-$C_6$ aliphatic, $C_3$-$C_6$ cycloaliphatic, $C_1$-$C_{12}$ alkoxy, and $C_1$-$C_{12}$ alkyl ester; and $R_3$, $R_4$, $R_5$, and $R_6$ are the same or different and are each independently selected from one or more of hydrogen, and $C_1$-$C_2$ aliphatic. In certain aspects, article may be an electronic device.

In other aspects, an article of manufacture is provided comprising a polymer prepared from a composition containing the polymer comprising units of Formula II wherein m and p may be the same or different and are each an integer from 0-4; each $R_1$ and $R_2$ are the same or different and are each independently selected from one or more of halogen, $C_1$-$C_{12}$ alkyl, $C_1$-$C_6$ aliphatic, $C_3$-$C_6$ cycloaliphatic, $C_1$-$C_{12}$ alkoxy, and $C_1$-$C_{12}$ alkyl ester; and $R_3$, $R_4$, $R_5$, and $R_6$ are the same or different and are each independently selected from one or more of hydrogen, and $C_1$-$C_2$ aliphatic; and n is an integer from 1 to 500. In certain aspects, the article may be an electronic device.

In other aspects, an article of manufacture is provided comprising a polymer comprising units of Formula IIIa

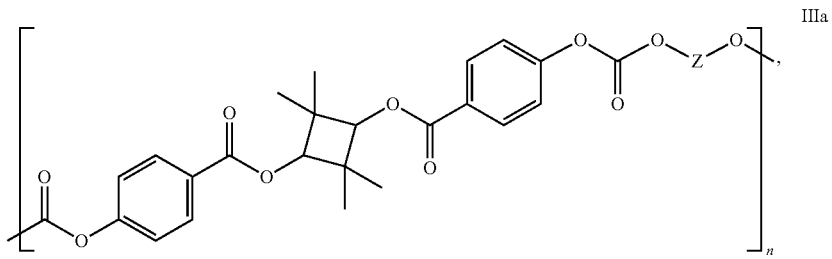

wherein n is an integer from 1 to 500; and Z is an aromatic moiety or an aliphatic moiety.

In certain aspects, the article may be is an electronic device. In some aspects, the polymer may be a polycarbonate.

In certain embodiments, the polymer may have a thermal degradation temperature of between about 350° C. to about 450° C. as determined by thermal gravimetry analysis.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 1 shows $^1$H NMR spectra of PC-1 (top), PC-2 (center) and BPA-PC (bottom) in $CDCl_3$.

DETAILED DESCRIPTION

The present disclosure may be understood more readily by reference to the following detailed description of desired embodiments and the examples included therein, and discussed in detail below.

In describing embodiments, specific terminology is employed for the sake of clarity. However, the disclosure is not intended to be limited to the specific terminology so selected. A person skilled in the relevant art will recognize that other equivalent components can be employed and other methods developed without departing from the broad concepts of the current disclosure. All references cited herein are incorporated by reference in their entirety as if each had been individually incorporated. Headings used herein are provided for clarity and organizational purposes only, and are not intended to limit the scope of the disclosure.

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

In the following specification including the claims which follow, reference is made to a number of terms which shall be defined to have the following meanings.

The singular forms "a," "an," and "the" include plural referents unless the context clearly dictates otherwise. All ranges disclosed herein are inclusive of the recited endpoint and independently combinable (for example, the range of "from 2 grams to 10 grams" is inclusive of the endpoints, 2 grams and 10 grams, and all the intermediate values).

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

The term "integer" means a whole number and includes zero. For example, the expression "n is an integer from 0 to 4" means n may be any whole number from 0 to 4, including zero.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The terms "aliphatic" and "alkyl" refer to a linear or branched array of atoms that are not cyclic, have a valence of at least one, and have at least one carbon atom. The array of atoms may include single bonds, double bonds, or triple bonds (typically referred to as alkane, alkene, or alkyne). Alkyl groups may be substituted or unsubstituted. Examples of substituent groups include halogen, alkoxy, alkanoyl, mercapto groups, ester, amino, amide, nitro, nitrile, alkoxycarbonyl, carboxyl, hydroxyl, thiol, aryloxy or carbonyl. The array of atoms may include heteroatoms such as nitrogen, sulfur, silicon, selenium and oxygen or may be composed exclusively of carbon and hydrogen. Exemplary aliphatic groups include, but are not limited to, methyl, ethyl, isopropyl, isobutyl, chloromethyl, hydroxymethyl (—CH$_2$OH), mercaptomethyl (—CH$_2$SH), methoxy, methoxycarbonyl (CH$_3$OCO—), nitromethyl (—CH$_2$NO$_2$), and thiocarbonyl.

The term "aromatic" or "arylene group" refers to an array of atoms having a valence of at least one and comprising at least one aromatic group. The array of atoms may include heteroatoms such as nitrogen, sulfur, selenium, silicon and oxygen, or may be composed exclusively of carbon. The aromatic group may also include nonaromatic components. For example, a benzyl group is an aromatic group that comprises a phenyl ring (the aromatic component) and a methylene group (the nonaromatic component). Exemplary aromatic groups include, but are not limited to, phenyl, pyridyl, furanyl, thienyl, naphthyl, biphenyl, 4-trifluoromethylphenyl, 4-chloromethylphen-1-yl, and 3-trichloromethylphen-1-yl (3-CCl$_3$Ph-).

The term "cycloalkyl" refers to an array of atoms which is cyclic but which is not aromatic. The cycloaliphatic group may include heteroatoms such as nitrogen, sulfur, selenium, silicon and oxygen, or may be composed exclusively of carbon and hydrogen. A cycloaliphatic group may comprise one or more noncyclic components. For example, a cyclohexylmethyl group (C$_6$H$_{11}$CH$_2$) is a cycloaliphatic functionality, which comprises a cyclohexyl ring (the array of atoms which is cyclic but which is not aromatic) and a methylene group (the noncyclic component). Exemplary cycloaliphatic groups include, but are not limited to, cyclopropyl, cyclobutyl, 1,1, 4,4-tetramethylcyclobutyl, piperidinyl, and 2,2,6,6-tetramethylpiperydinyl.

The term "halogen" refers to F, Br, Cl and I. In some embodiments, halogen can be Br or Cl.

In describing the various embodiments below, it should be understood that any recited substituents for a particular embodiment can be combined with any other substituents from other embodiments.

In exemplary embodiments, the polymer is one or more units derived from a compound of Formula I

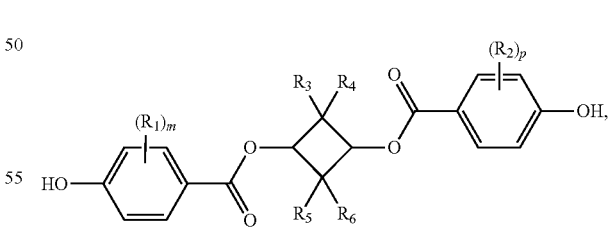

I wherein m and p may be the same or different and are each an integer from 0-4; each $R_1$ and $R_2$ are the same or different and are each independently selected from one or more of halogen, $C_1$-$C_{12}$ alkyl, $C_1$-$C_6$ aliphatic, $C_3$-$C_6$ cycloaliphatic, $C_1$-$C_{12}$ alkoxy, and $C_1$-$C_{12}$ alkyl ester; and $R_3$, $R_4$, $R_5$, and $R_6$ are the same or different and are each independently selected from one or more of hydrogen, and $C_1$-$C_2$ aliphatic. That is, each aromatic ring bearing $R_1$ and $R_2$ may have no substituents or can include up to four substituents, each of which may be the same or different. The two aromatic rings may have the same or different substitution patterns.

In some embodiments, $R_1$ and $R_2$ are the same or different and are each independently selected from one or more of halogen, $C_1$-$C_6$ alkyl, $C_3$-$C_6$ cycloaliphatic, $C_1$-$C_6$ alkoxy, and $C_1$-$C_6$ alkyl ester; and $R_3$, $R_4$, $R_5$, and $R_6$ are the same or different and are each independently selected from one or more of hydrogen, and $C_1$-$C_2$ aliphatic. In some embodiments, m and p are zero, and $R_3$, $R_4$, $R_5$, and $R_6$ are each methyl. In any embodiment, m and p can be 1 or 2.

In some embodiments, $R_1$ and $R_2$ are the same or different and are each independently selected from one or more of halogen, $C_1$-$C_{12}$ alkyl, $C_3$-$C_6$ cycloaliphatic, $C_1$-$C_{12}$ alkoxy and $C_1$-$C_{12}$ alkyl ester; and $R_3$, $R_4$, $R_5$, and $R_6$ are the same or different and are each independently selected from one or more of hydrogen, and $C_1$-$C_2$ alkyl.

In some embodiments, $R_3$ and $R_5$ are hydrogen, and $R_4$ and $R_6$ are methyl or ethyl. In some embodiments, none of $R_3$, $R_4$, $R_5$, and $R_6$ is hydrogen. In exemplary embodiments, $R_3$, $R_4$, $R_5$, and $R_6$ are the same or different and are each independently hydrogen, methyl or ethyl.

In exemplary embodiments, m is zero and p is non-zero, i.e., only the ring bearing $R_2$ is substituted; and in other exemplary embodiments, m and p are both zero, i.e., neither ring bearing $R_1$ or $R_2$ is substituted. In other exemplary embodiments, $R_1$ and $R_2$ can be the same or different and are each independently halogen, $C_1$-$C_6$ alkyl, methoxy, ethoxy of $C_1$-$C_6$ alkyl ester. In some embodiments, $R_1$ and $R_2$ are halogen, methyl or ethyl. In embodiments, $R_1$ and $R_2$ may be $C_1$-$C_{12}$ alkyl, aryl alkyl, or a halogen such as chlorine, bromine, or iodine.

In particular embodiments, the polymer may be derived from a monomer prepared from cyclobutane diol. In a specific embodiment, the polymer is prepared from tetramethylcyclobutane diol-2,5-bis(4-hydroxybenzoate) ("TMCBD-BP") having the structure Ia:

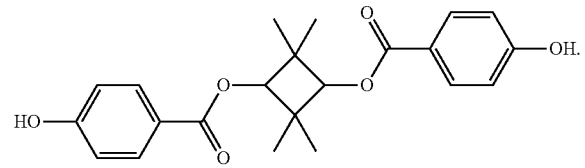

Ia

Methods of making the compound of Formula I are described in co-pending U.S. application Ser. No. 13/154,748, entitled "Bisphenol Compounds and Methods of Making", in the name of Jean-Francois Morizur et al., filed simultaneously herewith, and incorporated by reference in its entirety.

In embodiments, the polymer may be a polycarbonate homopolymer, or copolymer, or a polymer that includes segments thereof. In other embodiments, the polymer may be polyurethane, polyurea, polyarylate, polyester, polyether, polyetheramide, polyformyl, or polyphenylene ether, each of which may be a homopolymer or a copolymer, or a polymer that includes segments thereof. In some embodiments, the polymer is a component of a composition such as a resin formulation.

In some embodiments, the polymer includes one or more units of Formula II

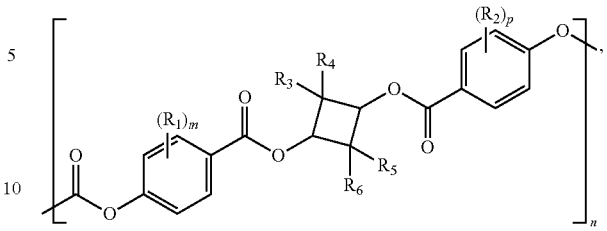

II wherein $R_1$, $R_2$, $R_3$, $R_4$, $R_5$, and $R_6$ are as defined above. In exemplary embodiments, each $R_1$ and $R_2$ are the same or different and are each independently selected from one or more of halogen, $C_1$-$C_{12}$ alkyl, $C_1$-$C_6$ aliphatic, $C_3$-$C_6$ cycloaliphatic, $C_1$-$C_{12}$ alkoxy, and $C_1$-$C_{12}$ alkyl ester; $R_3$, $R_4$, $R_5$, and $R_6$ are the same or different and are each independently selected from one or more of hydrogen, and $C_1$-$C_2$ aliphatic; and n is an integer from 2 to 500, for example about 2 to about 150. In some embodiments, n may be an integer from about 6 to about 350, about 20 to about 300, about 40 to about 120, about 120 to about 130, about 90 to about 180, or about 170 to about 210, or about 90 or about 180.

In some embodiments, the unit of Formula II has the structure of Formula IIa

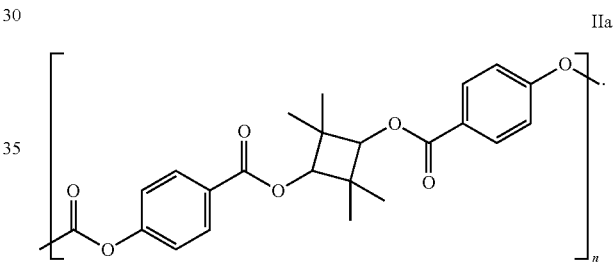

IIa

The polymer may have a weight average molecular weight (Mw) of about 3,000 to about 150,000, of about 10,000 to about 125,000, of about 20,000 to about 50,000, of about 50,000 to about 100,000, or of about 75,000 to about 90,000 g/mol. In specific embodiments, the molecular weight is about 40,000 to about 80,000, or about 40,000 or about 80,000 g/mol. Gel permeation chromatography (GPC) using polycarbonate standards, as well as other methods known in the art can be used to determine the molecular weight of the polymers and copolymers. Polymer structure can be confirmed via proton and/or $^{13}$C NMR spectroscopy and other analytical methods. Differential scanning calorimetry and other art recognized methods can allow for a determination of the glass transition temperature and melting point. Thermal Gravimetric Analysis can provide for a determination of the degradation temperature. Polydispersity Index (PDI) is a measure of the distribution of molecular mass in a given polymer sample and can be derived from the GPC results.

In embodiments, the polymer may have a glass transition temperature (Tg) of about 80° C. to about 300° C., about 100° C. to about 200° C., about 150° C. to about 165° C., or at least about 150° C., at least about 152° C., or at least about 165° C. In embodiments, the polymer may have a melting point (Tm) of about 180° C. to 224° C., or at least about 220° C. or at least about 224° C. In embodiments, the polymer may have a degradation temperature (Td) of about 350° C. to 450° C., about 350° C. to 395° C., about 390° C. to 395° C., or at least about 390° C. or at least about 395° C.

In some embodiments, the polymer includes units of Formula III

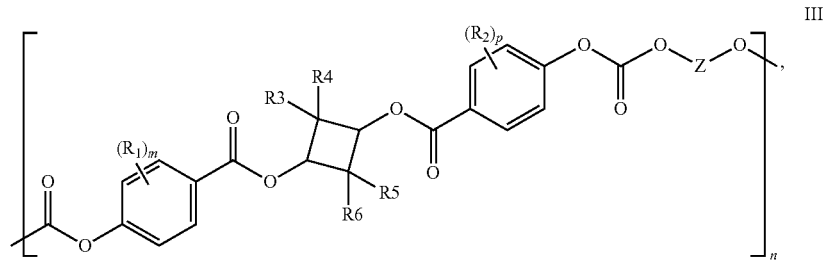

wherein $R_1$, $R_2$, $R_3$, $R_4$, $R_5$, and $R_6$ are as defined above; n is an integer from 1 to 150; and O—Z—O comprises a structure of Formula V

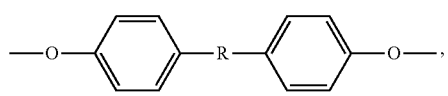

wherein R is selected from the one or more of alkyl, aryl, and alkylaryl hydrocarbons of 1 to 20 carbon atoms, disubstituted oxygen, sulfone, and spirobiindane. In specific embodiments, R is selected from one or more of alkyl groups having from 1-8 carbon atoms, isopropylidene, 1-phenylethyl, spirobiindane and mixtures thereof.

In some embodiments, the unit of Formula III is the structure of Formula IIIa

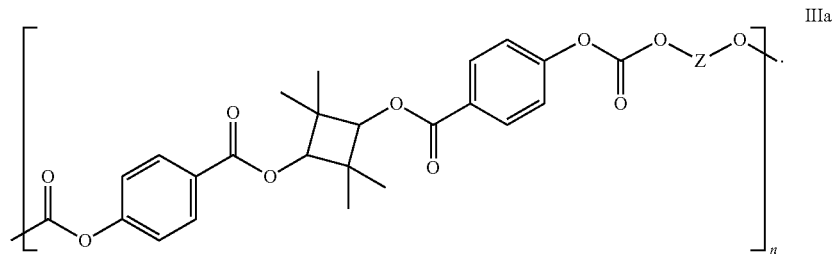

In some embodiments, a compound of Formula I may be polymerized with a dihydroxy compound of the following Formula V:

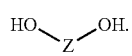

where Z may be an aromatic moiety or an aliphatic moiety, i.e., the compound of Formula V may be an aromatic dihydroxy compound or an aliphatic dihydroxy compound. The monomer units, i.e. the compound of Formula I together with the compound of Formula V, may be polymerized with a compound selected from one or more of phosgene, acyl halide, haloformate, cyanate, ester, epoxy, arylcarbonate, anhydride, diacetic acid, acid chloride, and carboxylic acid.

Exemplary aromatic dihydroxy compounds used as monomer units include, but are not limited to at least one of the following: 4,4'(3,3,5-trimethylcyclohexylidene)diphenol; 4,4'-bis(3,5-dimethyl)diphenol, 1,1-bis(4-hydroxy-3-methylphenyl)cyclohexane, 1,1-bis(4'hydroxy-3'methylphenyl) cyclohexane, 4,4'-1-methyl-4-(1-methyl-ethyl)-1,3-cyclohexandiyl]bisphenol (1,3 BHPM), 4-[1-[3-(4-hydroxyphenyl)-4-methylcyclohexyl]-1-methyl-ethyl]-phenol (2,8 BHPM), 3,8-dihydroxy-5a,10b-diphenyl-coumarano-2',3',2,3-coumarane (DCBP), 2-phenyl-3,3-bis (4-hydroxyphenyl)heptane, 2,4'-dihdroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane, 2,2-bis(3-phenyl-4-hydroxyphenyl)propane, 2,2-bis(4-hydroxy-3-methylphenyl) propane, 2,2-bis(4-hydroxy-3-ethylphenyl)propane, 2,2-bis (4-hydroxy-3-isopropylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl)cyclohexymethane, 2,2-bis(4-hydroxyphenyl)-1-phenylpropane, 2,4-dihydroxyphenyl sulfone, 4,4'-dihydroxydiphenylsulfone (BPS), bis(4-hydroxyphenyl)methane (bisphenol F, BPF), 4,4'dihydroxy-1,1-biphenyl, 2,6-dihydroxy naphthalene, hydroquinone, resorcinol, C1-3 alkyl-substituted resorcinols, 3-(4-hydroxyphenyl)-1,1,3-trimethylindan-5-ol, 1-(4-hydroxyphenyl)-1,3,3-trimethylindan-5-ol, or 2,2,2',2'-tetrahydro-3,3,3',3'-tetramethyl-1,1'-spirobi[1H-indene]-6,6'-diol.

In some embodiments, the compound of Formula V is bisphenol A, and the polymer includes units of polymer IIIb,

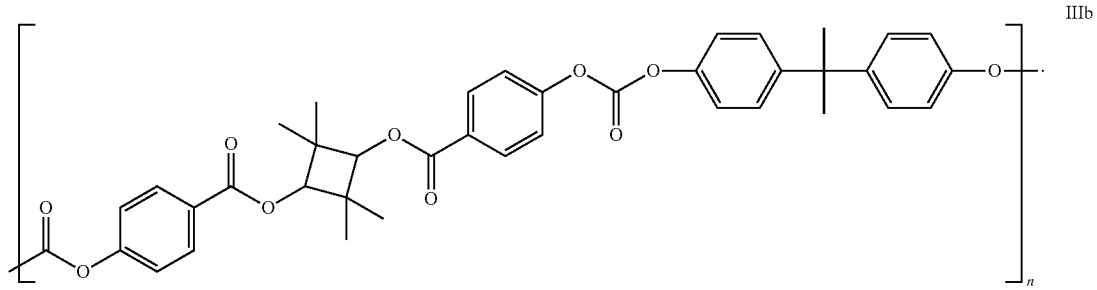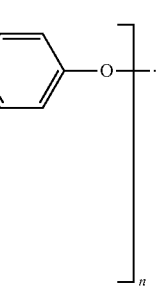

In some embodiments, the polymer is a copolymer of a compound of Formula I having units of Formula VI

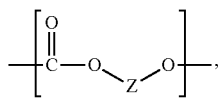

wherein —O—Z—O— is a fragment of Formula IV

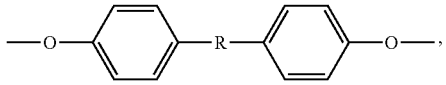

wherein R is selected from one or more of alkyl, aryl, and alkylaryl hydrocarbons of 1 to 20 carbon atoms, disubstituted oxygen, sulfone, and spirobiindane.

Also disclosed, is a polymer prepared from a compound of Formula I.

The present disclosure also provides a process for preparing a polymer comprising polymerizing a compound of Formula I.

In some embodiments, the compound of Formula I is polymerized in the presence of one or more carbonyl precursors used to prepare polycarbonates from diols. Exemplary carbonyl precursors include, but are not limited to phosgene, triphosgene, diacyl halide, dihaloformate, dicyanate, diester, diepoxy, diarylcarbonate, dianhydride, dicarboxylic acid, or diacid chloride.

In particular embodiments, the compound of Formula I is reacted in the presence of phosgene, water and an organic solvent.

In other embodiments, the process includes copolymerizing a compound of Formula I with a compound of Formula VII,

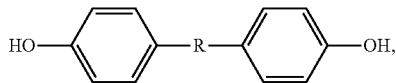

wherein R is selected from one or more of alkyl, aryl, and alkylaryl hydrocarbons of 1 to 20 carbon atoms, disubstituted oxygen, sulfone, and spirobiindane. In yet other embodiments, the compound of Formula VII is a compound of Formula VIII

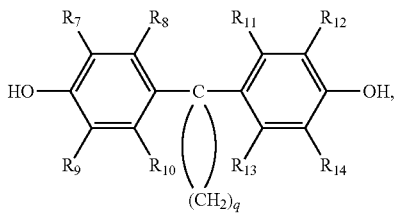

wherein q is an integer from 4-9, and each of $R_7$, $R_8$, $R_9$, $R_{10}$, $R_{11}$, $R_{12}$, $R_{13}$ and $R_{14}$ is independently selected from one or more of hydrogen or $C_1$-$C_6$ alkyl.

In particular embodiments, the compound of Formula VII is bisphenol A.

In some embodiments, the polymerization of the compound of Formula I and Formula VII or Formula VIII is conducted in the presence of one or more carbonyl precursors used to prepare polycarbonates from diols. Exemplary carbonyl precursors include, but are not limited to phosgene, triphosgene, diacyl halide, dihaloformate, dicyanate, diester, diepoxy, diarylcarbonate, dianhydride, dicarboxylic acid, or diacid chloride.

In further embodiments, the compound of Formula I and Formula VII or Formula VIII are reacted in the presence of phosgene, water and an organic solvent.

The polymer can be manufactured by suitable processes, such as interfacial polymerization and melt polymerization. For example, polycarbonates can be manufactured by processes such as interfacial polymerization. Although the reaction conditions for interfacial polymerization can vary, an exemplary process generally involves dissolving or dispersing a diol reactant, such as, for example, the compound of Formula I or other diols or dihydroxy compounds disclosed herein, in aqueous caustic soda or potash, adding the resulting mixture to a water-immiscible solvent medium, and contacting the reactants with a carbonyl precursor in the presence of a catalyst such as, for example, triethylamine or a phase transfer catalyst, under controlled pH conditions, e.g., 8 to 11. Commonly used water immiscible solvents include methylene chloride, 1,2-dichloroethane, chlorobenzene, toluene, and the like.

Exemplary carbonyl precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonyl precursors can also be used. In exemplary embodiments, an interfacial polymerization reaction to form carbonate linkages uses phosgene as a carbonyl precursor, and is referred to as a phosgenation reaction.

Among the phase transfer catalysts that can be used are catalysts of the Formula $(R_{15})_4Q^+X^-$, wherein each $R_{15}$ is the same or different, and is a $C_1$-$C_{10}$ alkyl group; Q is a nitrogen or phosphorus atom; and X is a halogen atom or a $C_1$-$C_8$ alkoxy group or $C_{6-8}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl, Br, a $C_1$-$C_8$ alkoxy group or a $C_6$-$C_{18}$ aryloxy group. An effective amount of a phase transfer catalyst can be 0.1 to 10 wt % based on the weight of the diol in the reaction mixture. In another embodiment an effective amount of phase transfer catalyst can be 0.5 to 2 wt % based on the weight of diol.

In some embodiments, the polymerizing comprises an interfacial polymerization reaction. In other embodiments, the polymerization comprises a melt polymerization reaction.

The polymers and compositions may further include other additives which can be incorporated with polymeric compositions, with the proviso that the additives are selected so as not to adversely affect the desired properties of the compound or polymer. Mixtures of additives may be used. Such additives may be mixed at a suitable time during the mixing of the components. Examples of such additives include fillers, anti-oxidants, heat stabilizers, light stabilizers, plasticizers, lubricants, antistatic agents, flame retardants, impact modifiers, and anti-drip agents. Additives may be added to the polymers of the invention or the blend generated with other compounds to make subject polymers.

The herein described polymers may be blended with other polymers, such as thermoplastics and thermosets. The herein described polymers may be blended with polycarbonates including, but not limited to, conventional BPA polycarbonate and polycarbonates made using monomers such as resorcinol, 1,1-bis(4'-hydroxy-3'methyl phenyl)cyclohexane and 4,4'[1-methyl-4-91-methylethyl)-1,3-cyclohexandiyl] bisphenol. The herein described polymers may be blended with an aliphatic polyester. The aliphatic polyester may be, for example, polycyclohexylidene cyclohexanedicarboxylate (PCCD).

The polymers, compounds and compositions described herein may be incorporated into various articles of manufacture. For example, the polymers, compounds and compositions may be polymerized, alone or together with other monomeric, oligomeric, or polymeric species. The compounds and polymers of the present disclosure are suitable for use in molding articles to provide shaped articles. The shaped articles can be compression molded, injection molded, blow molded, injection-blow-molded, or extruded. The article can be, for example, a solid sheet, an extruded multi-wall sheet, a cast film, or an extruded film. The article can also be a multi-layered article where the outer layer is made from the polymer. Such multi-layered articles include a co-extruded solid sheet, a co-extruded multi-wall sheet, a co-extruded film, or a film cast onto a separately molded part. Alternatively, the multi-layered article may be made by molding a different resin or polymer composition onto a film made from the polymer. Examples of such applications include TV and notebook bezels. Articles, including multi-layer articles may be used in electronic devices, such as mobile phones and other consumer electronic products.

In one embodiment, the article of manufacture comprises a polymer prepared from a composition containing the polymer of Formula I

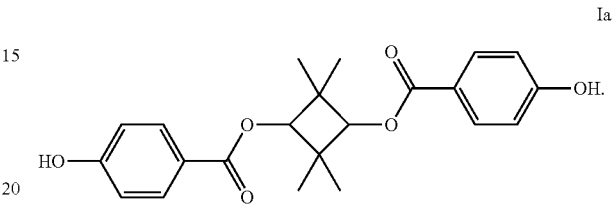

wherein m and p may be the same or different and are each an integer from 0-4; each $R_1$ and $R_2$ are the same or different and are each independently selected from one or more of halogen, $C_1$-$C_{12}$ alkyl, $C_1$-$C_6$ aliphatic, $C_3$-$C_6$ cycloaliphatic, $C_1$-$C_{12}$ alkoxy, and $C_1$-$C_{12}$ alkyl ester; and $R_3$, $R_4$, $R_5$, and $R_6$ are the same or different and are each independently selected from one or more of hydrogen, and $C_1$-$C_2$ aliphatic.

In a further embodiment, the polymer is a polycarbonate.

In a further embodiment, the article is used an electronic device.

In another embodiment, the article of manufacture comprises a polymer prepared from a composition containing the compound of Formula Ia Ia In other embodiments, the article of manufacture comprises a polymer which includes one or more units of Formula II

II wherein $R_1$, $R_2$, $R_3$, $R_4$, $R_5$, and $R_6$ are as defined above. In exemplary embodiments, each $R_1$ and $R_2$ are the same or different and are each independently selected from one or more of halogen, $C_1$-$C_{12}$ alkyl, $C_1$-$C_6$ aliphatic, $C_3$-$C_6$ cycloaliphatic, $C_1$-$C_{12}$ alkoxy, and $C_1$-$C_{12}$ alkyl ester; $R_3$, $R_4$, $R_5$, and $R_6$ are the same or different and are each independently selected from one or more of hydrogen, and $C_1$-$C_2$ aliphatic; and n is an integer from 2 to 150.

In some embodiments, the article of manufacture comprises a polymer which includes one or more units of Formula IIa IIa In some embodiments, the article of manufacture comprises a polymer which includes one or more units of Formula III

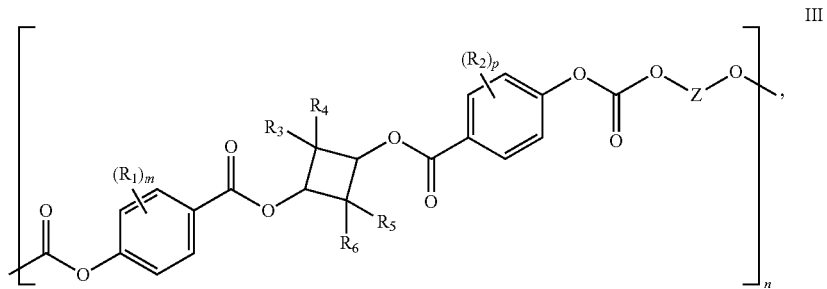

wherein $R_1$, $R_2$, $R_3$, $R_4$, $R_5$, and $R_6$ are as defined above; n is an integer from 1 to 150; and O—Z—O comprises a structure of Formula V

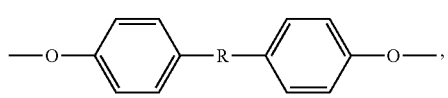

wherein R is selected from the one or more of alkyl, aryl, and alkylaryl hydrocarbons of 1 to 20 carbon atoms, disubstituted oxygen, sulfone, and spirobiindane. In specific embodiments, R is selected from one or more of alkyl groups having from 1-8 carbon atoms, isopropylidene, 1-phenylethyl, spirobiindane and mixtures thereof.

In some embodiments, the article of manufacture comprises a polymer, which includes one or more units of Formula IIIa

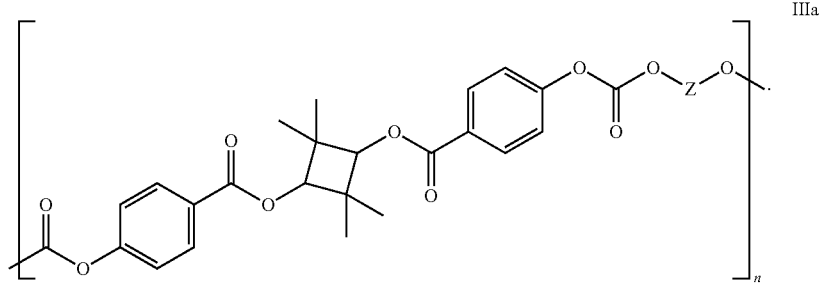

In some embodiments, the article of manufacture comprises a polymer, which includes one or more units of Formula IIIb

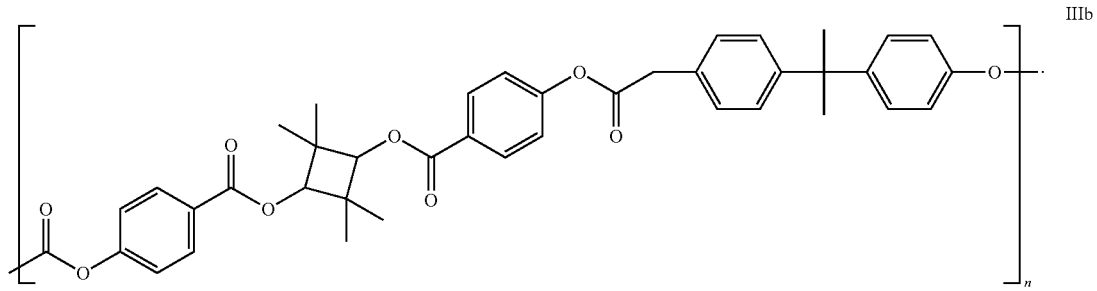

In a further embodiment, the article is used an electronic device.

EXAMPLES

The examples listed below are illustrative and are not intended to limit the scope of the disclosure.

Example 1

Synthesis and Purification of tetramethylcyclobutane diol-2,5-bis(4-hydroxybenzoate) (TMCBD-BP; Ia)

40.0 g (0.277 mol.) of TMCBD was taken in a 2-necked round bottom fitted with a nitrogen inlet and a distillation condenser. To this 200 ml of xylene was added. The bath temperature was slowly increased to 150° C. during which 168.0 g (1.21 mol.) of methyl 4-hydroxybenzoate was added. The reaction mixture was thoroughly mixed and the bath temperature was gradually increased to 180° C. during which, 2.76 g (0.0077 mol.) of dibutyltin oxide was added. The reaction mixture was kept with stirring at that temperature for 22 hours, while distilling out xylene and methanol formed during the reaction. The reaction was stopped when the selectivity of TMCBD-BP with respect to the monoester was about 80%, (i.e. about 80% diester and about 20% monoester based on the combination of % areas for the mono and diester of butane diol being about 100%), beyond which continuing the reaction would lead to increase in the formation of oligomers. Selectivity towards the desired product was monitored by high performance liquid chromatography (HPLC). Reaction progress was monitored by measuring the area % of the mono ester and diester of TMBCD using high pressure liquid chromatography (HPLC). The solvent system used for HPLC analysis was acetonitrile/water (with 0.02% phosphoric acid) with gradient elution using C18, 15 cm, 5 micron column & detection at 254 nm. The reaction mixture was then cooled to 100° C. (internal temperature) following which 150 ml of 1,2-dichloroethane was added and the mixture was refluxed for 3 hours when the desired product precipitates out. The reaction mixture was then cooled to room temperature and made to stand for 4 hours at room temperature for complete precipitation of the desired product. The precipitated solid was filtered, washed thoroughly with hot dichloroethane (~200 ml) and dried. 38.0 g of off-white solid with purity 97% (determined by HPLC area %) was obtained.

35.0 g of the crude material was refluxed (to dissolve) in 350 ml of EtOAc. To this 3.5 g of activated charcoal was added and the mixture was heated to reflux for 1 hour. The charcoal was filtered and washed thoroughly with hot EtOAc (150 ml). The volume of the filtrate obtained was reduced in a rotary evaporator under vacuum to 2 wt/vol, (i.e., ~70 ml) when the desired product begins to crystallize. The mixture was allowed to stand at room temperature for about 5 hours. Complete crystallization of the desired product was ensured by cooling the material (to 0° C.) in ice for 2 hours. Precipitated solid was filtered, washed with ice cold EtOAc:Hexane (50:50) solvent mixture (1 wt/vol.) and dried.

28.0 g of the pure TMCBD-BP with purity 99.3% (determined by HPLC area %) was obtained. M.P.=275.2° C.; $^1$H NMR (DMSO-$d_6$, 300 MHz): δ 10.2 (s, 2H, Ar—OH), δ 7.8 (s, 4H, Ar—H), δ 6.8 (s, 4H, Ar—H), δ 4.6 (s, 2H, H—CO—), δ 1.2 (s, 12H, —CH$_3$); LC/MS: 383.8 (M−1).

Example 2

Homopolymer Synthesis and Characterization

The following were added into a 2 liter glass reactor equipped with an overhead condenser, a phosgene inlet and a pH probe allowing monitoring pH during the course of the reaction: (a) TMCBD-BP from Example 1 (10 g, 0.026 mol); (b) p-cumylphenol (0.17 g, 0.0008 mol); (b) triethylamine (0.04 mL, 0.0003 mol); (c) methylene chloride (500 mL); and (d) de-ionized water (300 mL). The reaction was allowed to stir for 10 minutes and the pH was maintained at pH=8 by the addition of 30 wt-% NaOH solution. The mixture was charged with phosgene (4 g, 2 g/min, 0.04 mol). During the addition of phosgene, base (30 wt-% NaOH in deionized water) was simultaneously charged to the reactor to maintain the pH of the reaction between 9 to 10. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot water. The polymer was dried in an oven at 110° C. before analysis.

Gel permeation chromatography (GPC) allowed for a determination of the molecular weight of the resulting homopolymer PC-1 (79,498 g/mol, PDI=2.32, polycarbonate standards). The resulting polymer structure was confirmed via $^1$H NMR spectroscopy (see FIG. 1). Differential scanning calorimetry (DSC) experiments revealed a glass temperature of 165° C. and a melting temperature of 224° C.

Thermal gravimetry analysis experiments revealed an onset degradation temperature of 390° C.

Example 3

Copolymer Synthesis and Characterization

A copolymer of TMCBD-BP monomer and 2,2-bis(4-hydroxyphenyl)propane (BPA) was obtained via interfacial polymerization. The following were added into a 2 liter glass reactor equipped with an overhead condenser, a phosgene inlet and a pH probe allowing monitoring pH during the course of the reaction: (a) BPA (5.93 g, 0.026 mol); (b) TMCBD-BP from Example 1 (10 g, 0.026 mol); (c) p-cumylphenol (0.33 g, 0.0016 mol); (d) triethylamine (0.04 mL, 0.0003 mol); (e) methylene chloride (500 mL); and (f) de-ionized water (300 mL). The reaction was allowed to stir for 10 minutes and the pH was maintained at pH=8 by the addition of 30 wt-% NaOH solution. The mixture was charged with phosgene (8 g, 2 g/min, 0.081 mol). During the addition of phosgene, base (30 wt-% NaOH in deionized water) was simultaneously charged to the reactor to maintain the pH of the reaction between 9 to 10. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot water. The polymer was dried in an oven at 110° C. before analysis.

Gel permeation chromatography (GPC) allowed for a determination of the molecular weight of the resulting homopolymer PC-2 (37,882 g/mol, PDI=3.01, polycarbonate standards). The resulting polymer structure was confirmed via $^1$H NMR spectroscopy (see FIG. 1). Differential scanning calorimetry experiments revealed a glass temperature of 152° C.

Thermal gravimetry analysis (TGA) experiments were performed on a TA 2950. The temperature was ramped at a heating rate of 20° C./min, under nitrogen atmosphere, to a temperature well above the degradation temperature (about 800° C.). The thermal degradation temperature corresponds to the onset of degradation of the material analyzed. The glass transition and melting temperature were measured by running dynamic scanning calorimetry (DSC) experiments, performed on a TA Q1000. The temperature was ramped at a heating rate of 20° C./min, under nitrogen atmosphere up to 250° C.

Thermal gravimetry analysis experiments revealed an onset degradation temperature of 395° C. (cf. Table 1).

TABLE 1

| Compositions and Properties | | |
|---|---|---|
| | Example 2 | Example 3 |
| Reaction Components | | |
| BPA, g | — | 5.93 |
| TMCBD-BP, g | 10 | 10 |
| p-cumylphenol, g | 0.17 | 0.33 |
| Triethylamine, mL | 0.04 | 0.04 |
| Phosgene, g | 4 | 8 |

TABLE 1-continued

Compositions and Properties

|  | Example 2 | Example 3 |
|---|---|---|
| Water, mL | 300 | 300 |
| Methylene chloride, mL | 500 | 500 |
| Properties |  |  |
| Resulting Polymer | PC-1 | PC-2 |
| Molecular weight, g/mol | 79,498 | 37,882 |
| Tg, °C. | 165 | 152 |
| Tm, °C. | 223 | — |
| Td, °C. | 390 | 395 |

The embodiments illustrated and discussed in this specification are intended only to teach those skilled in the art the best way known to the inventors to make and use the invention. Nothing in this specification should be considered as limiting the scope of the present disclosure. All examples presented are representative and non-limiting. The above-described embodiments of the disclosure may be modified or varied, without departing from the invention, as appreciated by those skilled in the art in light of the above teachings. It is therefore to be understood that, within the scope of the claims and their equivalents, the invention may be practiced otherwise than as specifically described.

I claim:

1. A polymer comprising units derived from a compound of Formula I

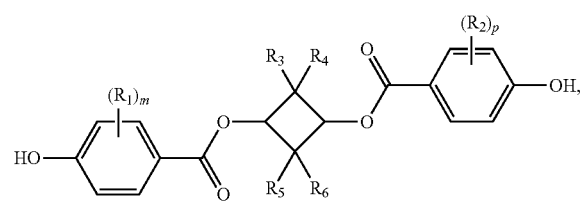

wherein m and p may be the same or different and are each an integer from 0-4; each $R_1$ and $R_2$ are the same or different and are each independently selected from one or more of halogen, $C_1$-$C_{12}$ alkyl, $C_1$-$C_6$ aliphatic, $C_3$-$C_6$ cycloaliphatic, $C_1$-$C_{12}$ alkoxy, and $C_1$-$C_{12}$ alkyl ester; and $R_3$, $R_4$, $R_5$, and $R_6$ are the same or different and are each independently selected from one or more of hydrogen, and $C_1$-$C_2$ aliphatic.

2. The polymer of claim 1, wherein the compound of Formula I comprises tetramethylcyclobutane diol-2,5-bis(4-hydroxybenzoate) of Formula Ia

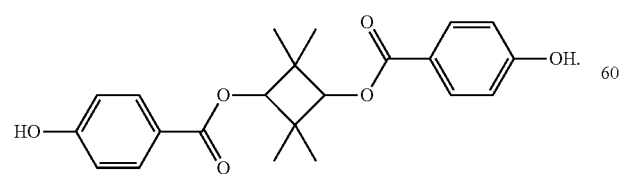

3. The polymer of claim 1, wherein the polymer is a homopolymer or copolymer and is selected from one or more of polycarbonate, polyurethane, polyurea, polyarylate, polyester, polyether, polyetheramide, polyformyl, and polyphenylene ether.

4. The polymer of claim 1, further comprising units derived from Formula V:

wherein Z is an aromatic moiety or an aliphatic moiety.

5. A polymer comprising units of Formula II

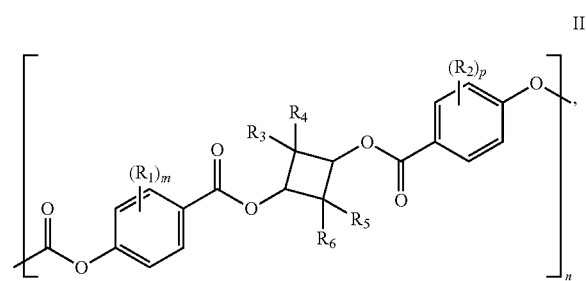

wherein m and p may be the same or different and are each an integer from 0-4; each $R_1$ and $R_2$ are the same or different and are each independently selected from one or more of halogen, $C_1$-$C_{12}$ alkyl, $C_1$-$C_6$ aliphatic, $C_3$-$C_6$ cycloaliphatic, $C_1$-$C_{12}$ alkoxy, and $C_1$-$C_{12}$ alkyl ester; and $R_3$, $R_4$, $R_5$, and $R_6$ are the same or different and are each independently selected from one or more of hydrogen, and $C_1$-$C_2$ aliphatic; and n is an integer from 1 to 500.

6. The polymer of claim 5, wherein the polymer is a copolymer and further comprises units of Formula VI

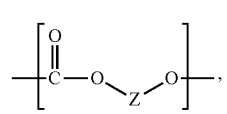

wherein Z is an aromatic moiety or an aliphatic moiety or —O—Z—O— is a fragment of Formula IV

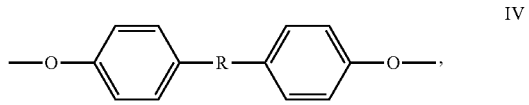

wherein R is selected from one or more of alkyl, aryl, and alkylaryl hydrocarbons of 1 to 20 carbon atoms, disubstituted oxygen, sulfone, and spirobiindane.

7. The polymer of claim 6 comprising units of Formula III

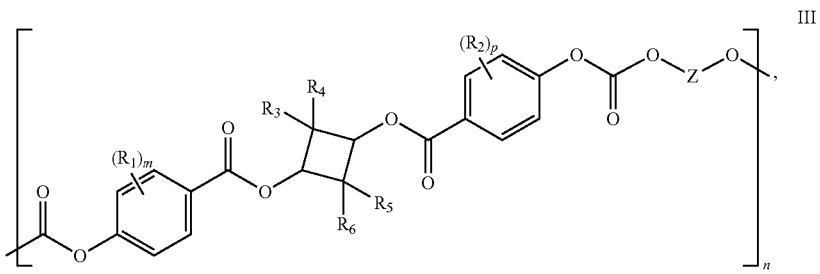

wherein m and p may be the same or different and are each an integer from 0-4; each $R_1$ and $R_2$ are the same or different and are each independently selected from one or more of halogen, $C_1$-$C_{12}$ alkyl, $C_1$-$C_6$ aliphatic, $C_3$-$C_6$ cycloaliphatic, $C_1$-$C_{12}$ alkoxy, and $C_1$-$C_{12}$ alkyl ester; and $R_3$, $R_4$, $R_5$, and $R_6$ are the same or different and are each independently selected from one or more of hydrogen, and $C_1$-$C_2$ aliphatic;

n is an integer from 1 to 500; and

Z is an aromatic moiety or an aliphatic moiety or O—Z—O comprises a structure of Formula IV

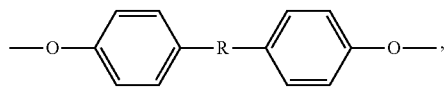

wherein R is selected from one or more of alkyl, aryl, and alkylaryl hydrocarbons of 1 to 20 carbon atoms, disubstituted oxygen, sulfone, and spirobiindane.

8. The polymer of claim 7, wherein R is selected from one or more of alkyl groups having from 1-8 carbon atoms, isopropylidene, 1-phenylethyl, spirobiindane and mixtures thereof.

9. A polymer comprising units of the Formula IIa

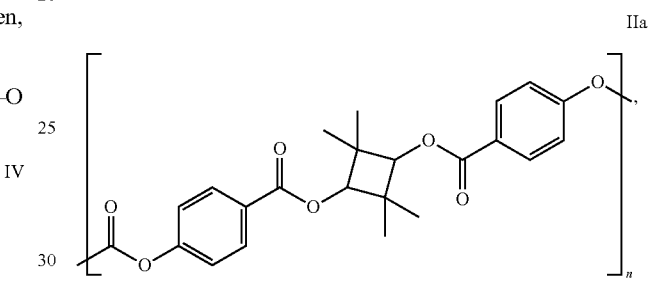

wherein n is an integer from 1 to 500.

10. A polymer comprising units of Formula IIIa

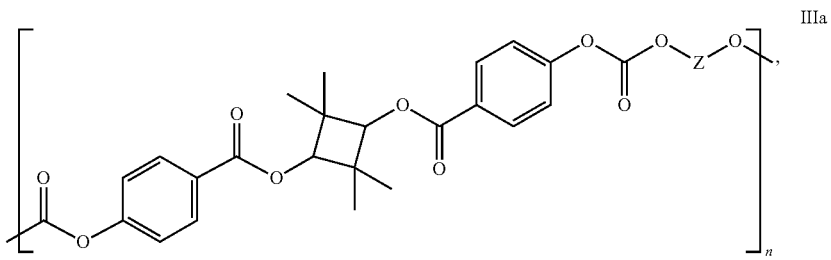

wherein n is an integer from 1 to 500; and
Z is an aromatic moiety or an aliphatic moiety.

11. The polymer of claim 10, wherein Z is from bisphenol A and the polymer includes units of Formula IIIb

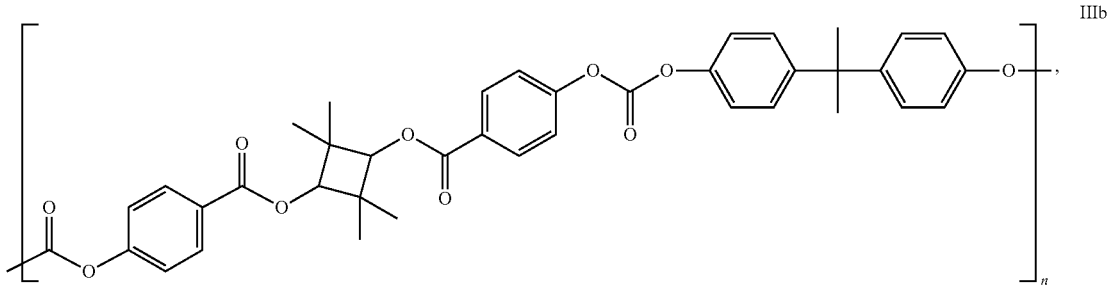

12. A polymer prepared from a compound of Formula I.

13. A process for preparing a polymer comprising polymerizing a compound of Formula I.

14. The process of claim 13, the compound of Formula I is added to a formulation comprising phosgene, water and an organic solvent.

15. The process of claim 13, wherein the polymer is a homopolymer.

16. The process of claim 13, wherein the polymer is a copolymer.

17. The process of claim 16, wherein the compound of Formula I is copolymerized with a compound of Formula VII,

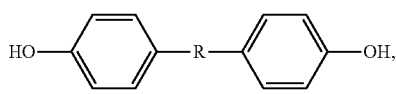

wherein R is selected from one or more of alkyl, aryl, and alkylaryl hydrocarbons of 1 to 20 carbon atoms, disubstituted oxygen, sulfone, and spirobiindane.

18. The process of claim 17, wherein the compound of Formula VII comprises a compound of Formula VIII

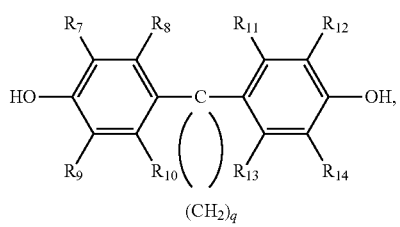

wherein q is an integer from 4-9, and each of $R_7$, $R_8$, $R_9$, $R_{10}$, $R_{11}$, $R_{12}$, $R_{13}$ and $R_{14}$ is independently selected from one or more of hydrogen or $C_1$-$C_6$ alkyl.

19. The process of claim 17, wherein the compound of Formula VII is bisphenol A.

20. The process of claim 17, the compound of Formula I and Formula VII are added to a formulation of phosgene, water and organic solvent.

21. The process of claim 13, wherein the polymerizing comprises an interfacial polymerization reaction.

22. The process of claim 13, wherein the polymerizing comprises melt polymerization reaction.

23. A process for preparing a polymer having units of the Formula IIa,

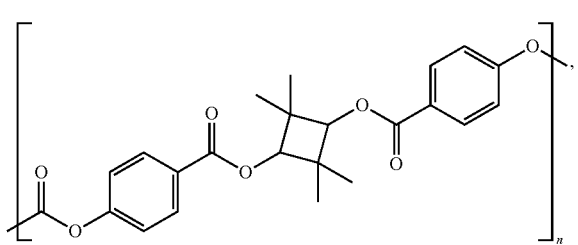

wherein n is an integer from 1 to 500, comprising adding a compound of Formula Ia

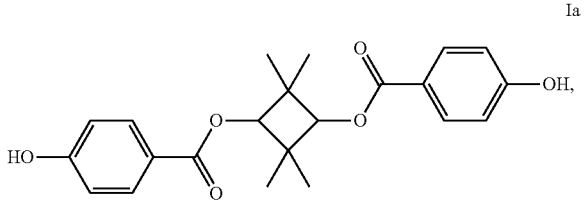

to a formulation comprising phosgene, water and organic solvent and polymerizing the compound of Formula Ia.

24. A process for preparing a polymer having units of the Formula IIIa,

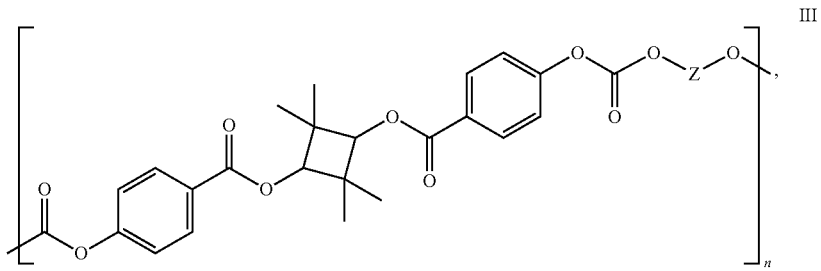

wherein n is an integer from 1 to 500 and Z is bisphenol A, comprising combining a compound of Formula I with bisphenol A, adding the combination to a formulation comprising phosgene, water and organic solvent and copolymerizing the compound of Formula I and bisphenol A.

25. An article of manufacture comprising a polymer prepared from a composition containing the polymer of claim 1.

26. The article of claim 25, wherein said article is an electronic device.

27. An article of manufacture comprising a polymer prepared from a composition containing the polymer of claim 5.

28. The article of claim 27, wherein said article is an electronic device.

29. An article of manufacture comprising a polymer prepared from a composition containing the polymer of claim 10.

30. The article of claim 29, wherein said article is an electronic device.

31. The article of claim 25, wherein said polymer is a polycarbonate.

32. The polymer of claim 1, wherein said polymer has a thermal degradation temperature of between about 350° C. to about 450° C. as determined by thermal gravimetry analysis.

* * * * *